(12) United States Patent
Ershov et al.

(10) Patent No.: US 8,091,086 B1
(45) Date of Patent: Jan. 3, 2012

(54) SYSTEM AND METHOD FOR VIRTUALIZATION USING AN OPEN BUS HYPERVISOR

(75) Inventors: Mikhail A. Ershov, Moscow (RU);
Alexander G. Tormasov, Moscow (RU);
Alexey B. Koryakin, Moscow (RU);
Serguei M. Beloussov, Singapore (SG)

(73) Assignee: Parallels Holdings, Ltd. (BM)

( * ) Notice: Subject to any disclaimer, the term of this patent is extended or adjusted under 35 U.S.C. 154(b) by 837 days.

(21) Appl. No.: 12/176,085

(22) Filed: Jul. 18, 2008

Related U.S. Application Data

(60) Provisional application No. 60/951,147, filed on Jul. 20, 2007.

(51) Int. Cl.
*G06F 9/455* (2006.01)
*G06F 9/46* (2006.01)

(52) U.S. Cl. .............................. 718/1; 718/108

(58) Field of Classification Search .............. 718/1, 108, 718/1.108
See application file for complete search history.

(56) References Cited

U.S. PATENT DOCUMENTS

| | | | |
|---|---|---|---|
| 6,496,847 B1 * | 12/2002 | Bugnion et al. | 718/1 |
| 7,089,377 B1 * | 8/2006 | Chen | 711/147 |
| 7,424,710 B1 * | 9/2008 | Nelson et al. | 718/1 |
| 2005/0076186 A1 * | 4/2005 | Traut | 712/1 |
| 2006/0146057 A1 * | 7/2006 | Blythe | 345/506 |
| 2008/0155536 A1 * | 6/2008 | Levit-Gurevich et al. | 718/1 |

* cited by examiner

*Primary Examiner* — Daniel Pan
(74) *Attorney, Agent, or Firm* — Bardmesser Law Group

(57) ABSTRACT

A computer system includes an Open Bus Hypervisor having the highest privilege level. An Open Bus Hypervisor is a set of modules that operate on the root level. The Open Bus Hypervisor provides support for processing, filtering and redirecting of low level events. The Open Bus Hypervisor is used primarily for maintenance and support of computer virtualization features, which are implemented within computer system CPU. Additionally, the Open Bus Hypervisor can be used for supporting new hardware and software modules installed on a computer system. A Virtual Machine Monitor (VMM) runs with fewer privileges than the Open Bus Hypervisor. A Primary Virtual Machine (PVM) runs without system level privileges and has a Primary Operating System (POS) running within it.

15 Claims, 12 Drawing Sheets

SYSTEM AND METHOD FOR VIRTUALIZATION USING AN OPEN BUS HYPERVISOR

CROSS-REFERENCE TO RELATED APPLICATIONS

The present application claims priority to the U.S. Provisional Patent Application No. 60/951,147, filed Jul. 20, 2007, entitled SYSTEM AND METHOD FOR VIRTUALIZATION USING AN OPEN BUS HYPERVISOR, which is incorporated herein by reference in its entirety.

BACKGROUND OF THE INVENTION

1. Field of the Invention

The present invention relates to extending functionality of a Primary Operating System (POS) in a virtualized system, and more particularly, to a method, system and computer program product for implementation of an Open Bus Hypervisor.

2. Background Art

The industry trend of virtualization and isolation of computer system resources presents two major challenges—virtualization at software level and virtualization at hardware level. A Virtual Machine (VM) is a type of an isolated Virtual Environment where multiple VMs can run on the same physical machine simultaneously. Each VM instance has a set of its own software components and uses hardware modules of the physical machine where the VM resides.

Often, there are multiple VMs created on a host operating system. In such system, some resources of the host operating system are isolated and allocated for running each of the VMs. An example of this type of system is a computing environment provided by VMware™. The VMware™ solution provides standardized isolated secured computing environments. This product is typically used as an enterprise level solution, where a number of VMware™ Virtual Machines are distributed throughout the computer system. However, the VMware™ solution does not provide adequate support for hardware virtualization.

Virtualization allows running a number of VMs on the same physical machine. Conventional systems, however, provide only limited support for a low level (i.e., hardware) virtualization.

With Virtual Machine (VM) technology, a user can create and run multiple virtual environments on a server at the same time. Each virtual environment, such as a VM, requires its own operating system (OS) and can run applications independently. The VM software provides a layer between the computing, storage, and networking hardware and the software that runs on it.

A Virtual Machine technology requires a mechanism for emulating or otherwise virtualizing the behavior not only of the software, but also of the hardware of a real physical machine or a processor. Generally, a VM is an environment that is launched on a particular processor that is running an operating system. Normally, the operating system installed on such a machine or processor has certain privileges that are not available to user applications. For example, many I/O commands can be privileged, and executable only in the operating system or in privileged mode. Certain areas of memory, or certain addresses in memory, also may require operating system privilege to be accessed.

A frequent situation that arises in this context is the problem of emulating (or, more broadly, virtualizing) a different operating system on the same processor. For example, with one version of Microsoft Windows running on the Intel x86 processor (for example, in a server environment), it may be necessary to emulate the behavior of another (different) version of Windows on the same Intel processor. This second operating system is generally referred to as "Guest OS," and the code that it executes is generally referred to as "guest code." Note that in order for the emulation to be meaningful, the Guest OS needs to execute privileged instructions as if it were actually running on the processor. In other words, the Guest OS, running as a Virtual Machine, is itself unaware that it is a Virtual Machine.

Execution of such privileged instructions, however, is the province of the native operating system. Therefore, any attempts by the Guest OS inside a VM to execute privileged instructions must be intercepted, so that they can be properly executed (or otherwise handled) by the VM. The component that is responsible for this interception and emulation of privileged instructions is called a "Virtual Machine Monitor" or "VMM."

A typical VMM enables a single physical machine or processor to act as if it were several physical machines. A typical VMM, under control of a high-ranking operating system (OS), can run a number of different operating systems simultaneously, such that each of these different operating systems is its own Virtual Machine.

In other words, the VMM can handle one or a number of Virtual Machines, each of which represents its own operating system, and each of which can run its own application software. Usually, the high-ranking OS is referred to as a "host OS" (HOS). The multiple operating systems that are running as Virtual Machines are usually referred to as "guest operating systems" ("Guest OS's") running "guest code." At the present time, one of the conventional mechanisms for structuring VMMs is a hosted VMM.

In the case of the hosted VMM, the VMM itself is not a full-fledged operating system. Such a VMM does not include device drivers, and cannot control hardware devices, such as I/O devices, directly. Such a hosted VMM is installed into the host operating system (HOS), and uses HOS API (application programming interface) to work with the I/O devices. Both the VMM and the HOS have system-level privileges, and exist on a physical computer concurrently. The VMM is responsible for preserving the context of the host operating system when switching from the HOS to the VMM, and is responsible for restoring the context of the HOS when switching back to the HOS. The hosted VMM can create any number of Virtual Machines, none of which have system-level privileges, and none of which can work with I/O devices directly. The VMM emulates the I/O devices for the VMs, and uses the HOS to work with the real I/O devices.

For each VM, a separate process is created, and the HOS is responsible for scheduling of both the VMs and other processes in the HOS. Conventional examples of hosted VMMs include VMware GSX Server, VMware Workstation, MS Virtual PC, MS Virtual Server and SVISTA 2004.

Hosted VMMs, however, have a major problem when it comes to a low level (i.e. hardware) virtualization. It can be inefficient or even impossible for a hosted VMM to use hardware virtualization technologies in new families of processors, such as, for example, Intel® Virtual Machine Extension (VMX) technology.

Accordingly, what is needed is a method and system for implementing an Open Bus Hypervisor that allows VMMs to efficiently utilize the hardware virtualization technologies.

SUMMARY OF THE INVENTION

The present invention is directed to a system, method and computer program product for implementation of an Open Bus Hypervisor for hardware virtualization that substantially obviates one or more of the problems and disadvantages of the related art.

An Open Bus Hypervisor, according to one proposed embodiment, is a set of modules that operate in the root mode. The Open Bus Hypervisor provides support for processing, filtering and redirecting of low level events. The proposed Open Bus Hypervisor is used primarily for maintenance and support of computer virtualization features which are implemented within computer system CPU. Additionally, the Open Bus Hypervisor can be used for supporting new hardware and software modules installed on a computer system.

In one proposed embodiment, a computer system that includes an Open Bus Hypervisor having the highest privilege level is provided. A Virtual Machine Monitor (VMM) runs within than the Open Bus Hypervisor. A Primary Virtual Machine (PVM) runs without system level privileges and a Primary Operating System (POS) running within the Open Bus Hypervisor.

The Open Bus Hypervisor can have hardware drivers used by other components for accessing hardware through the Open Bus Hypervisor. The Open Bus Hypervisor can also have other hardware drivers used by the other components for accessing other hardware through the Open Bus Hypervisor.

The system can include a number of VMMs controlling a number of VMs. The system can also have at least one Guest OS running within one of the VMs. The Guest OS can work with virtualized hardware, and hardware access requests from the Guest OS or its VMM are translated by the Open Bus Hypervisor to real hardware using the POS.

The Open Bus Hypervisor supports hardware virtualization by exclusively using hardware virtualization solutions, such as VT-X from INTEL and AMD-V from AMD, and providing VT-X related APIs to other modules of the system kernel. The proposed Open Bus Hypervisor provides for efficient exchange of low level events between Primary OS (POS) and VMMs. Note that the POS and the VMM work in their own contexts, and the Open Bus Hypervisor provides for exchange of the events in different formats.

The Open Bus Hypervisor, according to an exemplary embodiment, is responsible for handling hardware virtualization features and sharing the hardware virtualization features between different VMMs. The VMMs can be of different types and can even be produced by different vendors.

Additional features and advantages of the invention will be set forth in the description that follows. Yet further features and advantages will be apparent to a person skilled in the art based on the description set forth herein or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 1:
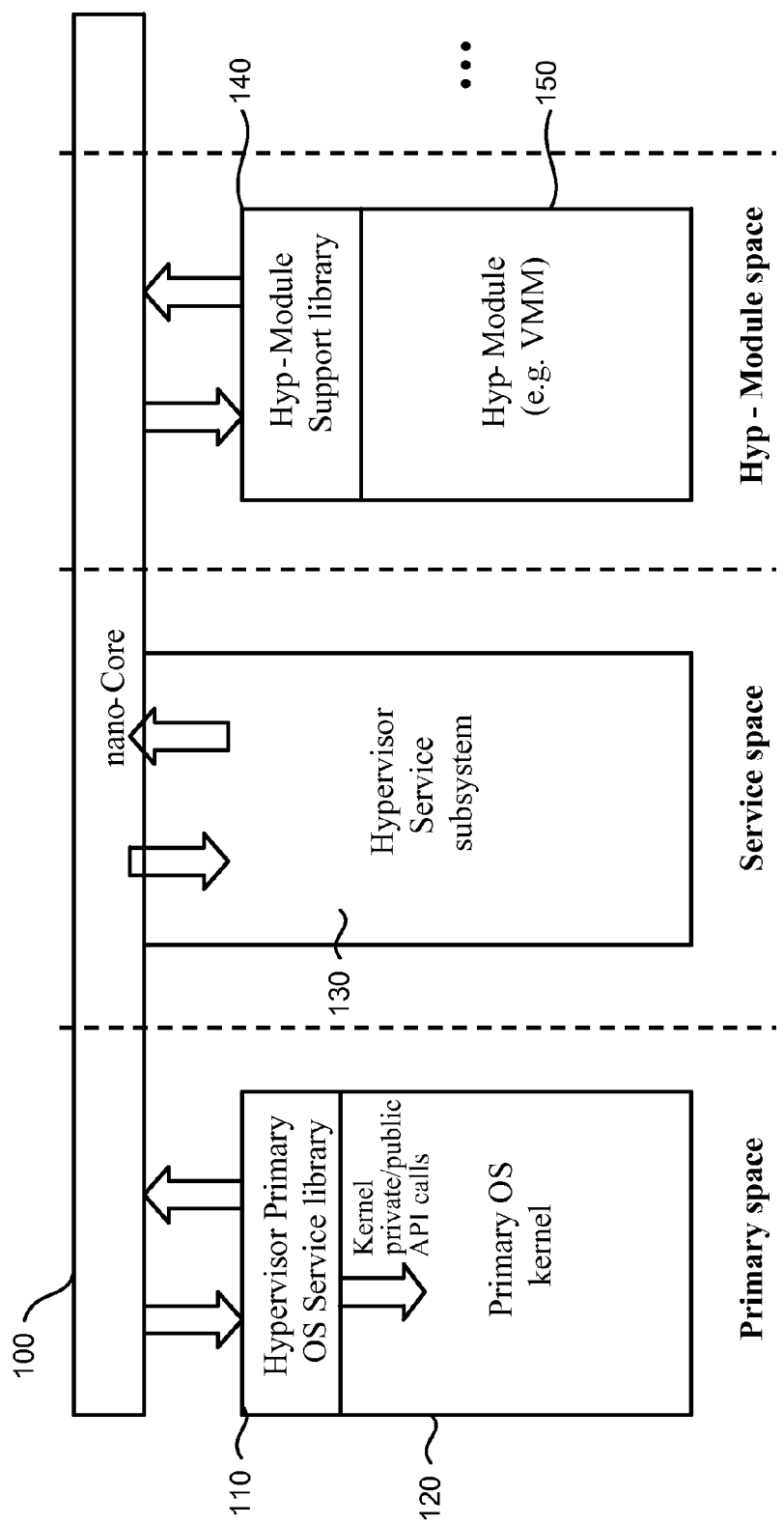
FIG. 1 illustrates an Open Bus Hypervisor architecture in accordance with an exemplary embodiment.

Reference will now be made in detail to the embodiments of the present invention, examples of which are illustrated in the accompanying drawings.

The present invention is therefore directed to extending functionality of a Primary OS (POS) by implementation of an Open Bus Hypervisor. The Open Bus Hypervisor, according to the preferred embodiment, extends the functionality of a POS that is not supported in the core of an operating system. An example of such an extensibility is hardware processor features virtualization support, such as hardware virtualization technologies (VT-x and AMD-V), DMA Remapping technology (VT-d), Trusted Execution Technology (TXT), etc.

The Open Bus Hypervisor, according to the preferred embodiment, is a set of modules that operate in the root mode of a processor with hardware virtualization support enabled. The Open Bus Hypervisor provides support for processing, filtering and redirecting of low-level events. The Open Bus Hypervisor is used primarily for maintenance and support of computer virtualization features that are implemented within computer system CPU. Additionally, the Open Bus Hypervisor has extension means that can be used for supporting new hardware and software modules installed on a computer system.

The low level events can be generally of two types—hardware related, such as, for example exceptions, interrupts, hardware-implemented virtualization instructions (such as VMENTER, VMEXIT, VMON, VMOFF, VMCS), etc. and software related, such as, for example API calls sent from a VM to a Primary OS. An Open Bus Hypervisor processes these events and redirects them to appropriate modules for further processing.

In the preferred embodiment, a computer system that includes an Open Bus Hypervisor having the highest privilege level is provided. In the Intel family of processors, the various privilege regimes are referred to as "privilege levels," and are set through appropriate processor registers. In the Intel IA-32 architecture, Ring 0 and Ring 1 privilege levels can be used to implement the Open Bus Hypervisor. It should be noted that although the particular examples given in this discussion relate to the Intel architecture, the invention is not limited to the Intel architecture, and is applicable to any number of processor families and processor architectures.

The Open Bus Hypervisor can have the highest system-level privileges, for example, Ring 0 privileges for the Intel IA-32 architecture, or "root" for the VT-X architecture. A Virtual Machine Monitor (VMM) runs with fewer privileges than the Open Bus Hypervisor. Thus, VMM is at least one privilege level lower, for example, at Ring 1 privilege level with root level enabled. According to the preferred embodiment, a Primary Virtual Machine (PVM) runs without system level privileges and has a Primary operating system (POS) running within it. The POS can be the same operating system that is used on the computer system without implementation of an Open Bus Hypervisor. The POS can have hardware drivers used by other components for accessing hardware through the POS.

The Open Bus Hypervisor can have hardware drivers used by other components for accessing hardware through the Open Bus Hypervisor. Additionally, the POS can have some hardware drivers used by other components for accessing hardware, and the Open Bus Hypervisor can have other hardware drivers used by the other components for accessing other hardware through the Open Bus Hypervisor. Thus, the POS can have no direct access to any real hardware devices.

The system can include a number of VMMs controlling a number of VMs and the system can have at least one Guest OS running within one of the VMs. The Guest OS can work with virtualized hardware, and hardware access requests from the Guest OS or its VMM are translated by the Open Bus Hypervisor to real hardware using the POS.

The Open Bus Hypervisor supports hardware virtualization by using VT-X solutions and providing VT-X related APIs to other modules of the system kernel. The proposed Open Bus Hypervisor provides for efficient exchange of low level events between POS and VMMs. Note that the POS and the VMM work in their own contexts, and the Open Bus Hypervisor provides for exchange of the events in different formats. Generally, a "context" is a collection of related processes and data whose names are not known outside of the context. Contexts partition operating system's name space into smaller, more manageable subsystems. They also "hide" names, ensuring that processes contained in them do not unintentionally conflict with those in other contexts.

A process in one context cannot explicitly communicate with, and does not know about, processes inside other contexts. All interaction across context boundaries must be through a "context process," thus providing a degree of security. The context process, according to the preferred embodiments, is implemented within the Open Bus Hypervisor Service subsystem transport support, discussed below in more detail.

The Open Bus Hypervisor, according to the preferred embodiment, is responsible for handling all hardware virtualization features and sharing the hardware virtualization features between different VMMs. The VMMs can be of different types and can even be produced by different vendors. Thus, the proposed Open Bus Hypervisor, can be used advantageously across different virtualization platforms.

The Open Bus Hypervisor is particularly useful for a new generation of Host OSs with support for hardware-based virtualization technology, such as Intel's VT-X (and/or VT-I) technology. Typically, during installation on a bare PC, such a HOS can detect the presence of VT-X and store this information in a registry. When restarted in a Primary VM without VT-X support, it could refuse to boot. Installation of the HOS under VMM in the Primary VM with already reduced privileges (in the absence of VT-X) can solve this problem. For example, the VMM can be installed on top of the HOS, and then the HOS can be reinstalled inside the Primary VM.

However, in many instances it is not practical to have a VMM that runs under the control of an already installed HOS. The HOS still runs in the Primary VM with reduced privileges and still uses it to access the I/O devices. The proposed Open Bus Hypervisor is helpful for a new generation of Host OSs with support for hardware-based virtualization technology, such as Intel's VT-X (and/or VT-I) technology.

Virtualization without an Open Bus Hypervisor would require that all the drivers be placed in VMM space. This approach is inefficient, since there are hundreds (or even thousands) of devices that most operating systems need to support. For example, there are numerous vendors of hard disk drives (and numerous models and types of hard disk drives), CD ROM drives, DVD-ROM drives, floppy disks, video cards, network cards, Wi-Fi cards and modems, mice, track-balls, etc. Most of these drivers are usually written by vendors themselves. Therefore, a large volume of untrusted third party code has to be placed within the VMM, which runs on the most privileged level and can, therefore, place the system at risk. But if the VMM displaces the original operating system, it needs to have all these drivers installed. In this case, the VMM can have a very large logical footprint in the system.

The problem of the VMM having a large logical footprint (i.e., having an amount of code that is comparable to the amount of code of a full-fledged operating system, such as, for example, LINUX or MS Windows) is solved by an Open Bus Hypervisor. The Open Bus Hypervisor can have exclusive control over the physical resources of the system, although it can grant certain rights to other components of the system, such as to the Primary OS, or, in some cases, to the Guest OS.

The Open Bus Hypervisor, according to the preferred embodiment, can restrict the ability of both the POS and the VMM to issue interrupt-related instructions. The Open Bus Hypervisor processes all interrupts and exceptions in the system and dispatches them to the POS and VMMs based on virtualization policies. Calls related to system resources, such as, for example, processing time and memory allocation, are not handled by the Open Bus Hypervisor and are redirected to the POS.

The Open Bus Hypervisor, has the following advantages as compared to regular or lightweight Hypervisors:
 (1) improved reliability;
 (2) operation at root level;
 (3) handling of low level events;
 (4) POS integration;
 (5) better stability through integration;
 (6) integrated API module;
 (7) extensible means for support of new hardware/software;
 (8) ability to re-enter Hypervisor from different VMMs.

A common Open Bus Hypervisor architecture and its modular organization is illustrated in FIG. 1. It includes a Hypervisor nano-core 100, a Hypervisor POS service subsystem 130 and POS service library 110. An Open Bus Hypervisor consist of three modules (i.e., spaces) connected over an open bus—nano-core 100. A Primary space includes a POS kernel 120 with a POS service library 110. The Hypervisor POS service library 110 provides API calls from the POS kernel 120 upon instruction from the Hypervisor POS service subsystem 130 located in Service space.

The API calls come from a VMM located in Hyp-Module 150, which also contains a Hyp-Module support library 140. The Hyp-Module support library 140 is used in communication, over the nano-core 100, with the Hypervisor POS service subsystem 130 of Service space. An Open Bus Hypervisor, according to the preferred embodiment, can have multiple Hyp-Modules 150 connected to a nano-core 100. The Open Bus Hypervisor not only provides the API to the POS kernel 120, but determines if these API calls are consistent with the VMM privilege level. Thus, the Open Bus Hypervisor implements a security mechanism.

Figure 2:
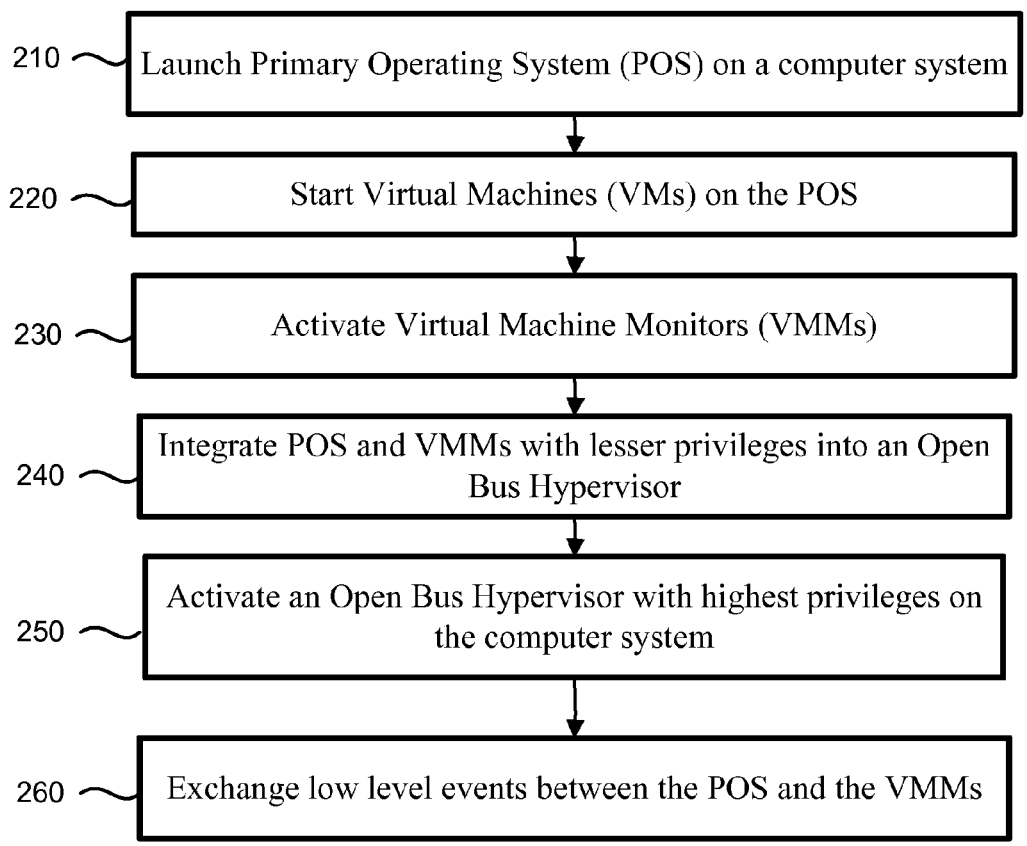
FIG. 2 illustrates a flow chart of a method for virtualizing a computer system by implementing an Open Bus Hypervisor in accordance with an exemplary embodiment.

FIG. 2 illustrates a flow chart of a method for virtualizing a computer system by implementing an Open Bus Hypervisor. According to the exemplary embodiment, a Primary Operating System (POS) is launched on a computer system (step 210). Then a number of Virtual Machines (VMs) are started on the POS, at step 220. (Note that here, the start of the VM refers not to execution of instructions in the context of the VM, but notification of the user or the OS regarding the possibility of launching the VM. In other words, an event is generated that reflects the fact that a certain number of VMs must be accessible for use. Then, the VMMs are initialized, in order to manage the VMs. The VMMs can also be launched only when one is needed to manage to VM, or can be launched before that.) The VMs run without the system level privileges. Virtual Machine Monitors for controlling the VMs are activated at step 230. Then, at step 240, the POS and VMMs are integrated into an Open Bus Hypervisor which is given the highest privilege. The Open Bus Hypervisor is then activated on the computer system, at step 250. Subsequently, low level events (such as, for example, exceptions, interrupts, virtualization-related instructions, API calls, etc.) are exchanged between the POS and the VMMs at step 260 using the Open Bus Hypervisor.

Figure 3:
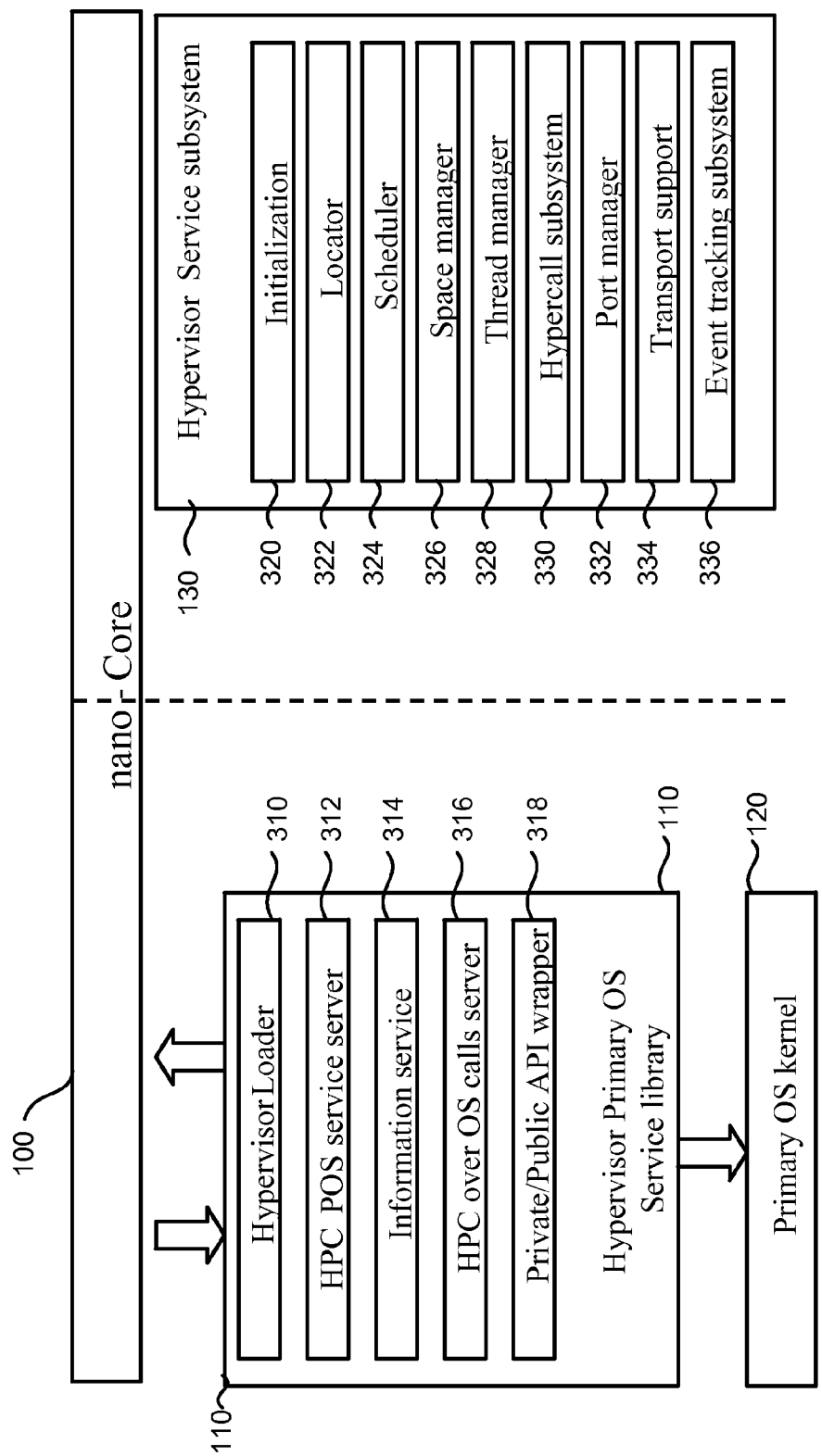
FIG. 3 illustrates an Open Bus Hypervisor service subsystem in accordance with an exemplary embodiment.

FIG. 3 illustrates the Open Bus Hypervisor service subsystem 130 depicted in FIG. 1 in accordance with the exemplary embodiment. It also shows how the Open Bus Hypervisor service subsystem 130 is integrated with the POS kernel 120. The Open Bus Hypervisor service subsystem 130 is a platform-independent part of the Hypervisor and provides all the service-related functionality of the Hypervisor. The Open Bus Hypervisor service subsystem 130 includes initialization means 320, locator 322, scheduler 324, space manager 326, thread manager 328, hypercall subsystem 330, port manager 332, transport support means 334 and event tracking subsystem 336. Initialization means 320 is used for starting up the Hypervisor Service subsystem 130. The initialization process typically includes the following:

(1) calculating the size of an unpacked Hypervisor module;

(2) allocating memory space and writing to the corresponding memory buffer;

(3) allocating buffers for organization of service space;

(4) organizing the service space with corresponding independent linear space;

(5) unpacking the module to the buffer according to the table of relocated items;

(6) allocating and writing to buffer for the nano-Core;

(7) initializing the nano-Core subsystem to be ready to provide communication between the Hypervisor Service subsystem and the Hypervisor POS library;

(8) organizing a Hypercall schema to open an interface for low level Hypervisor requests;

(9) calling the Hypervisor Service subsystem initialization function;

(10) opening primary communication port between the Hypervisor Service subsystem and the Hypervisor POS library.

The locator 322 is used for communication between modules. It locates open ports, sends message to these ports and receives return codes from these ports. Thus, communication between modules is established. The scheduler 324 is responsible for scheduling the polling cycles (i.e. scheduling port querying processes performed by the locator) and allocating time intervals for processing requests between Hypervisor modules. The space manager 326 is responsible for creation and management of the Hypervisor modules such as Hyp-modules, Service space and Primary space. The thread manager 328 is responsible for creating the threads in the POS for processing the requests between modules.

The Hypercall subsystem provides access to the Hypervisor services directly (not via ports) using special Hypercall switches. The functions that can be called using Hypercalls are mostly limited to sending and receiving port requests. The transport support means 334 is used for the convenience of creating extensions of the Hypervisor.

Transport support layer 334 provides means for making the API calls over the ports (as opposed to just data exchange). Transport support layer 334 provides a Hypervisor security mechanism, which determines what API calls can be requested and executed by which Hyp-Module 140 (in FIG. 1). The event tracking subsystem 336 processes low level events such as, for example, exceptions, interrupts, VMExits, API calls, etc.

The Hypervisor POS service library 110 is used for handling (i.e., translating) communications between the Hypervisor Service subsystem 130 and the POS 120. It includes a Hypervisor Loader 310, an HPC POS service server 312, an Information service 314, an HPC over OS calls server 316 and a Private/Public API wrapper 318. The Hypervisor Loader 310 is used at an initial stage of loading the Hypervisor when Service space and nano-Core 100 are not yet created. If the Hypervisor Loader 310 can not integrate the Hypervisor POS service library 110 into the POS 120, then the Hypervisor can be alternatively implemented as a driver working at the highest privilege level.

Figure 4:
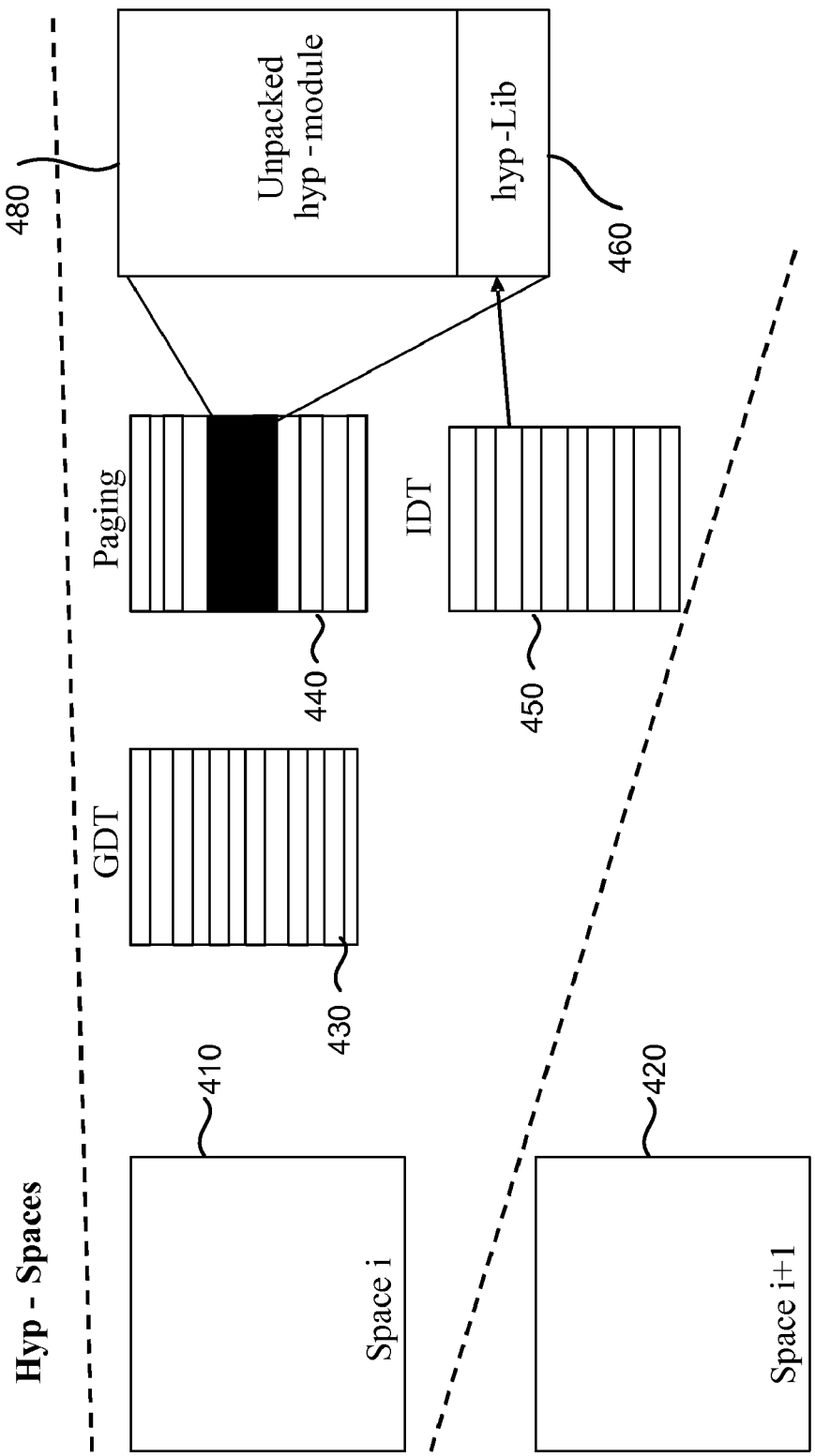
FIG. 4 illustrates a structure of Hyp-Spaces in accordance with an exemplary embodiment.

FIG. 4 illustrates a structure of Hyp-Spaces in the preferred embodiment. Hyp-space allocation is a technology that allows creation of a separate logical space for each of the modules of the Open Bus Hypervisor. Each Hyp-space, for example, Space i (410) or Space i+1 (420) is a specially allocated memory space with its own protocol for processing interrupts. Hyp-space includes paging structures 440 (i.e., organization of linear spaces for each of the modules), Global Descriptor Table (GDT) 430 used for organization of the segmental model (i.e., creation of address system to be used by processor), Interrupt Descriptor Table (IDT) 450 is used for processing and redirection of the interrupts. Initial processing of the interrupts is performed in a special static hyp library (hyp-Lib) 460, and then the interrupts are sent to other modules for further processing. The hyp library 460 is integrated into unpacked hyp-module 480.

Figure 5:
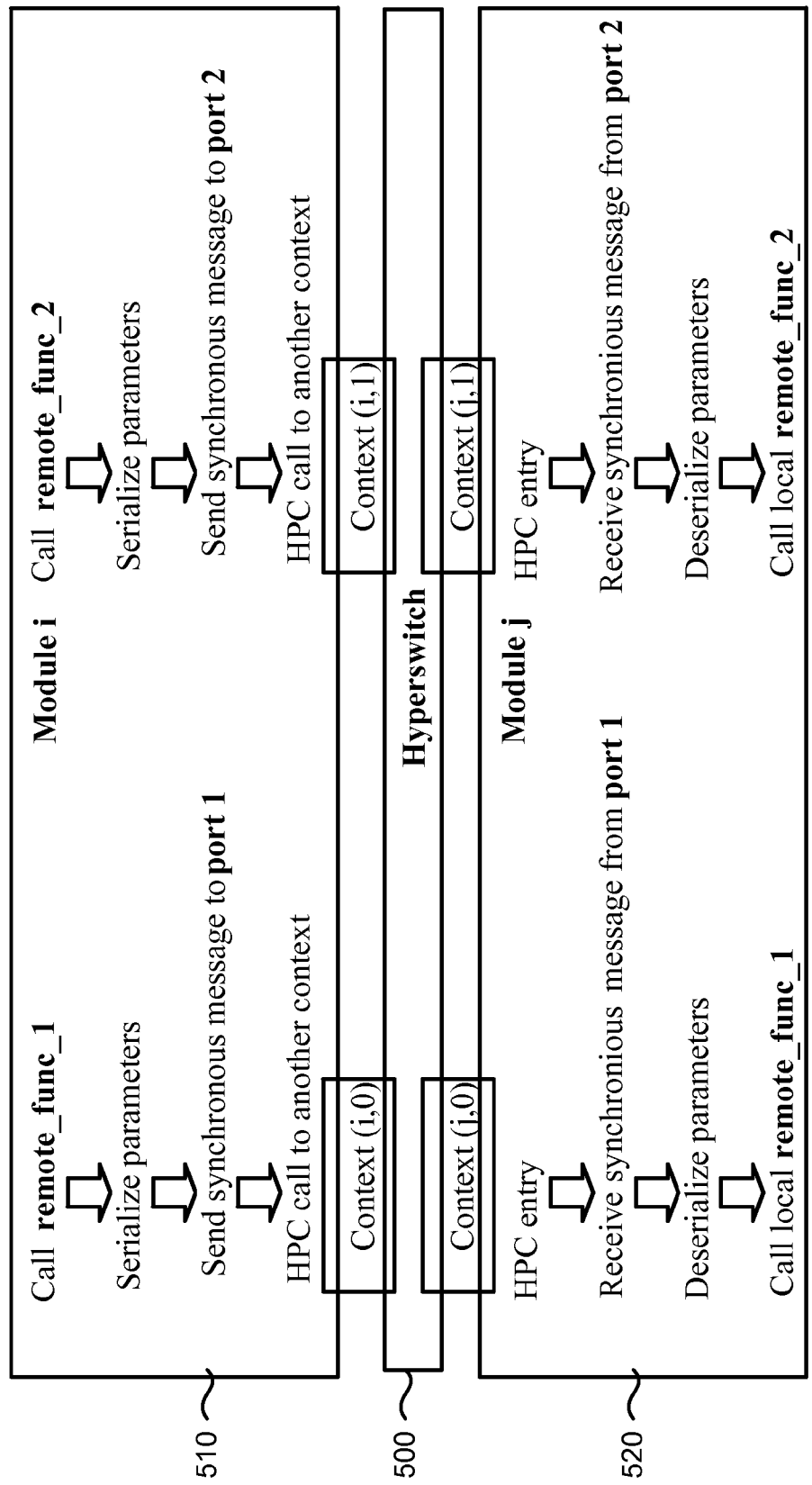
FIG. 5 illustrates handling of contexts by an Open Bus Hypervisor in accordance with an exemplary embodiment.

FIG. 5 illustrates handling of contexts by an Open Bus Hypervisor in the preferred embodiment. Context is referred to the memory space and sequence of execution of different calls or instructions within this space. (Here, "context" also refers to properties and settings of the software and hardware, needed to execute particular code. Each context can utilize, e.g., register values that need to be saved when switching to a different address space associated with a different context. Threads being executed are normally tied to a particular execution context.) FIG. 5 illustrates how instructions remote_func_1 and remote_func_2 are implemented within module i (510 in FIG. 5) in their own context (i, 0) and context (i, 1), respectively. The hyperswitch 500 of the Open Bus Hypervisor translates these instructions into contexts (j, 0) and (j, 1) for processing in the module j (520 in FIG. 5). (Note that "i,j" refers to a particular hyp-module. In other words, the address space for module i is one, and different for module j. To call a function of one space from one address space, one needs that function's formal description, i.e., function names and parameters. The HPC call is such a formal description, which is used for synchronous function calls between address spaces. When the function is called, control is transferred to the hyperswitch 500, where the context in which the function is implemented is determined, and then context is switched to the appropriate address space.

The hyp-module is a set of instructions with a particular set of properties and settings in the address, which is treated as a set of data. The hyp-module is loaded in this form into a particular context. Subsequently, the hyp-module can be called from any other context. At initial launch, the hyp-module is unpacked using the hypervisor loader 310. In this discussion, two hyp-modules are discussed (510 and 520), which have two different functions that can be called. However, the hyp-modules 510 and 520 can also be executed in the same context. "0,1" refers to an execution thread.

Figure 6:
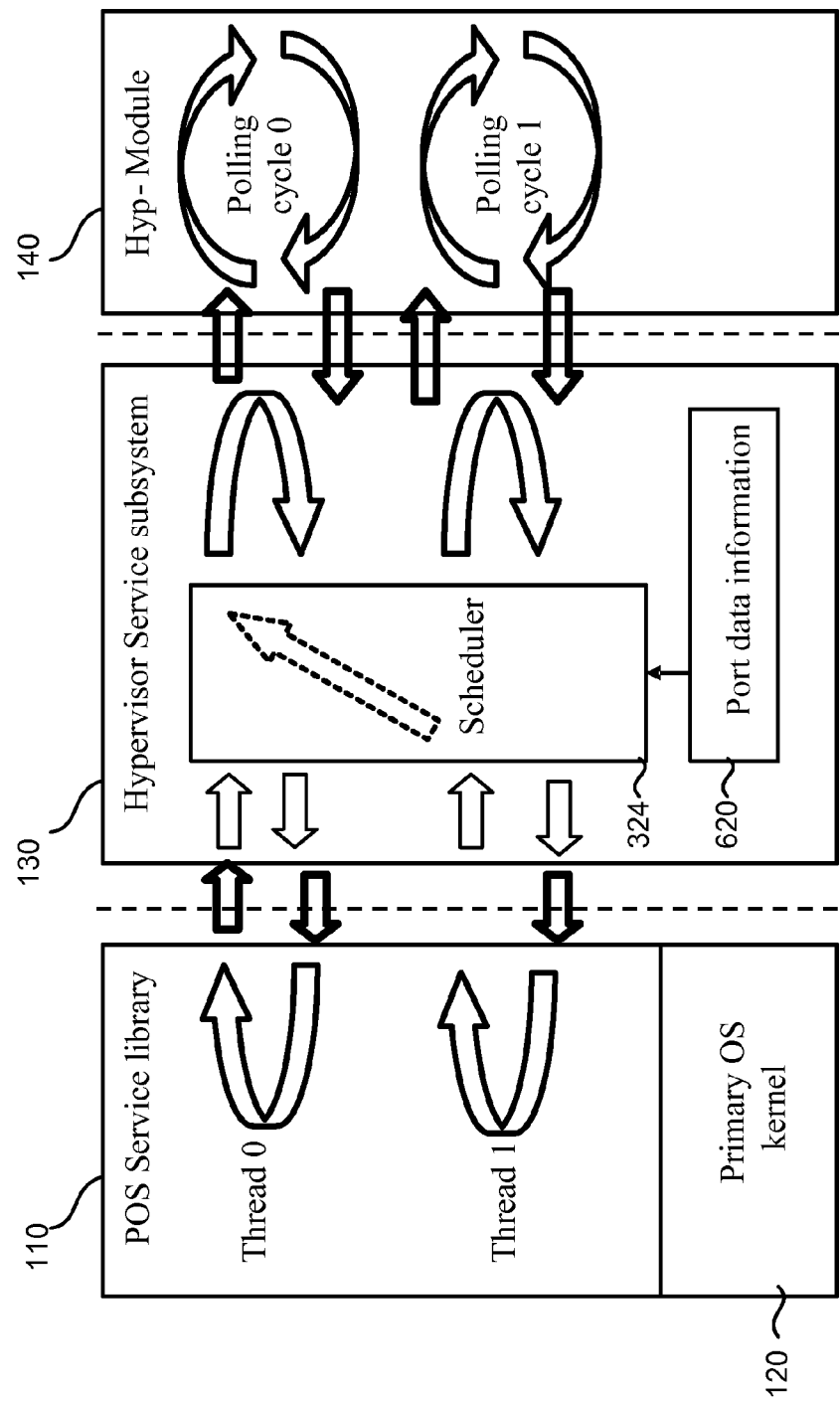
FIG. 6 illustrates processing of threads within an Open Bus Hypervisor Service subsystem, in accordance with an exemplary embodiment.

FIG. 6 illustrates processing of threads within an Open Bus Hypervisor Service subsystem 130. POS Service library 110 contains multiple threads. The threads are logical entities that define the sequences of executable instructions of each POS 120 process. In other words, each POS 120 process has its own thread. Multiple threads are concurrently implemented within the POS 120. A scheduler 324 of the Hypervisor Service subsystem 130 determines and allocates processing times for each thread. The scheduler 130 checks the pending polling cycles (i.e., queries to the ports) in the Hyp-Module 140 and, using the available port data information 620, determines the processing time needed for a particular thread and allocates this time to a corresponding polling cycle for processing the port messages.

Figure 7:
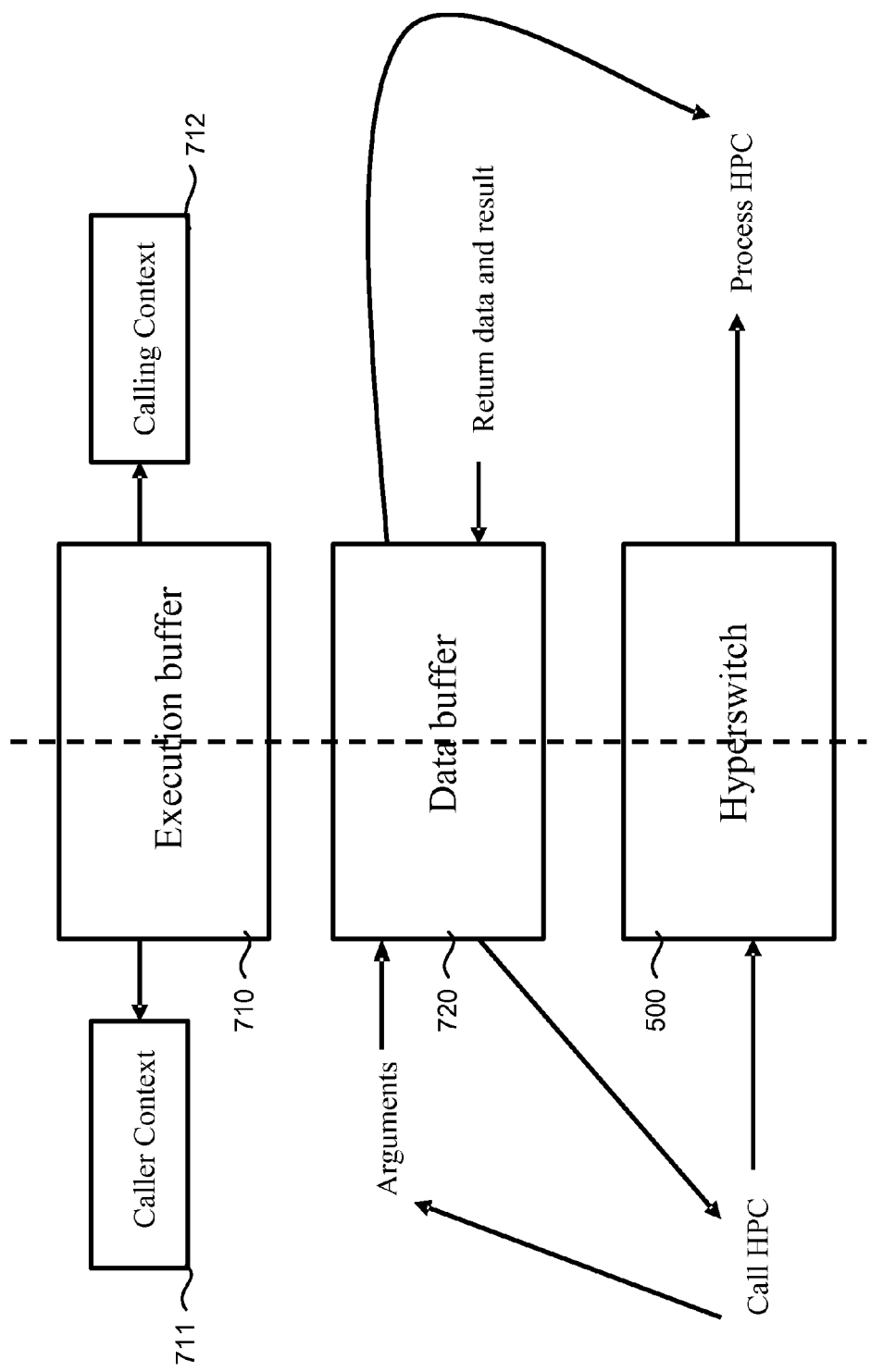
FIG. 7 illustrates organization of an Open Bus Hypervisor procedure calls in accordance with an exemplary embodiment.

FIG. 7 illustrates organization of an Open Bus Hypervisor procedure calls (HPCs) in the preferred embodiment. The Hyperswitch 500 depicted in FIG. 5, is located between Hypervisor modules and provides low level inter-modular communications. The dotted center line illustrates the boundary between modules. The Hyperswitch 500 receives and processes HPCs. The Hyperswitch 500 is coupled to a data buffer 720 and an execution buffer 710. The execution buffer 710 stores information about caller context 711 and calling context 712. The data buffer 720 is used for storing HPC-specific data if such data exists. HPC might also have no additional data.

Figure 8:
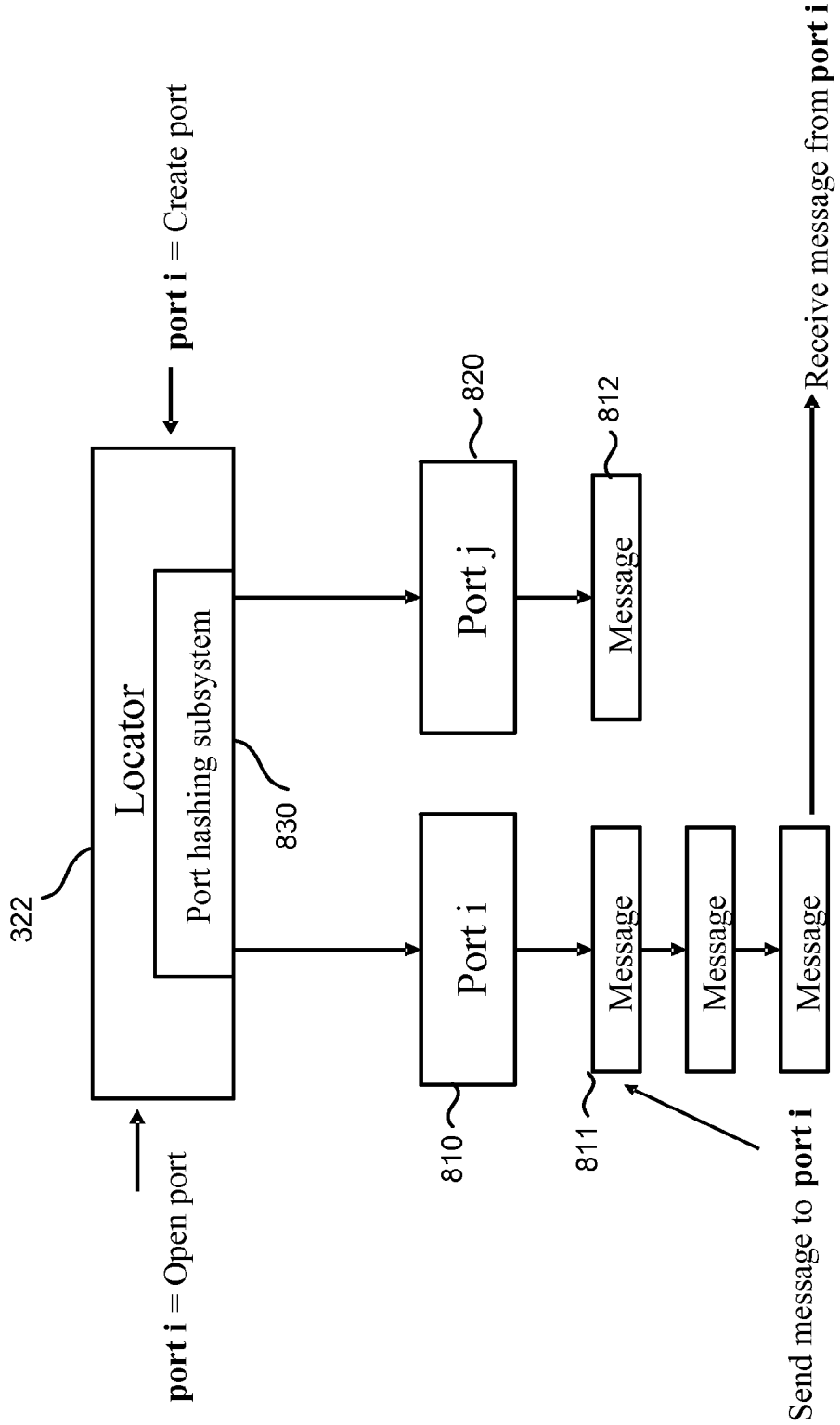
FIG. 8 illustrates functionality of a locator of an Open Bus Hypervisor in accordance with an exemplary embodiment.

FIG. 8 illustrates functionality of the locator 322 of an Open Bus Hypervisor in the preferred embodiment. The locator 322 queries the ports and finds ports that are open. These ports are used for interaction with other Hypervisor modules. Inter-module communication is based on messages send through the ports. The locator 322 has a port hashing subsystem 830, which is used for simplifying location of the ports 810 and 820 and for registering ports. In a multi-connection session port, hashing can help optimize entries in the connection ports table if many sessions are present between a pair of transmitting channel endpoints. (Endpoints refer to addressees in a complex data transmission system, which can be identified by their addresses. In this case, by "endpoints" what is referred to is not just the IP addressing, although TCP/IP can be used. Other possibilities, such as message passing systems or direct calls to a shared memory as well as some others, can be used In some cases port hashing may be used when session requires proxy server and a single IP address is used for many connections to many virtual environments. In such a case a lot of sessions, e.g., 100 or more sessions may be established between a pair of IP addresses. Herein "port hashing" may be used for overcoming the performance problems. Hash values for ports and IP addresses for each connection improve incoming packets processing. Overall, this mechanism optimizes the process of searching for a port. Then, each module can have a group of ports associated with it. Each port has a sequence of messages associated with it, which this port knows how to process. Any two modules can interact using the ports. But, to open a communication channel, it is necessary to open the port of another module. As such, the ports represent points through which the modules interact. Each port has message(s) that are waiting for processing. The locator 322 creates (i.e., registers) the located open ports. Then polling cycles for receiving messages 811 and 812 on these ports are initiated. Messages 811 and 812 can be of three general types: synchronous, semi-synchronous and asynchronous. The asynchronous scheme is the fastest, since the message originator does not have to wait for message processing (as in the case of synchronous messages) or for beginning of processing (as in the case of semi-synchronous messages).

Each module has to open a set of ports for interactions with other modules or with the Hypervisor. API calls are also implemented using port schema depicted in FIG. 8.

The transport layer allows to process remote function calls as if they are executed locally. This is the highest level of inter-modular communications. The transport layer requires serialization. According to the exemplary embodiment, the serialization is used for:

(a) packing structured object transmitted through the pointer;

(b) transferring or sharing temporary data buffer between spaces;

(c) unpacking structured pointed objects;

(d) packing transmitted arguments;

(e) unpacking transmitted arguments;

(f) providing correspondent pointer translation to temporary buffer data;

(g) packing and transmitting return results according to the same schema.

In the preferred embodiment, the Hyp-module of the Hypervisor has to be loaded. Loading includes:

(a) calculating the size of unpacked Hyp-module module;

(b) allocating and writing to the correspondent memory buffer;

(c) allocating buffers for Hyp-module space organization;

(d) organizing linear space, segment model for loaded module;

(e) unpacking module to the buffer taking into account the table of reallocated items;

(f) calling Hyp-Module initialization function;

(g) opening a primary communication port between hyp-Module and Hypervisor Service subsystem.

Figure 9:
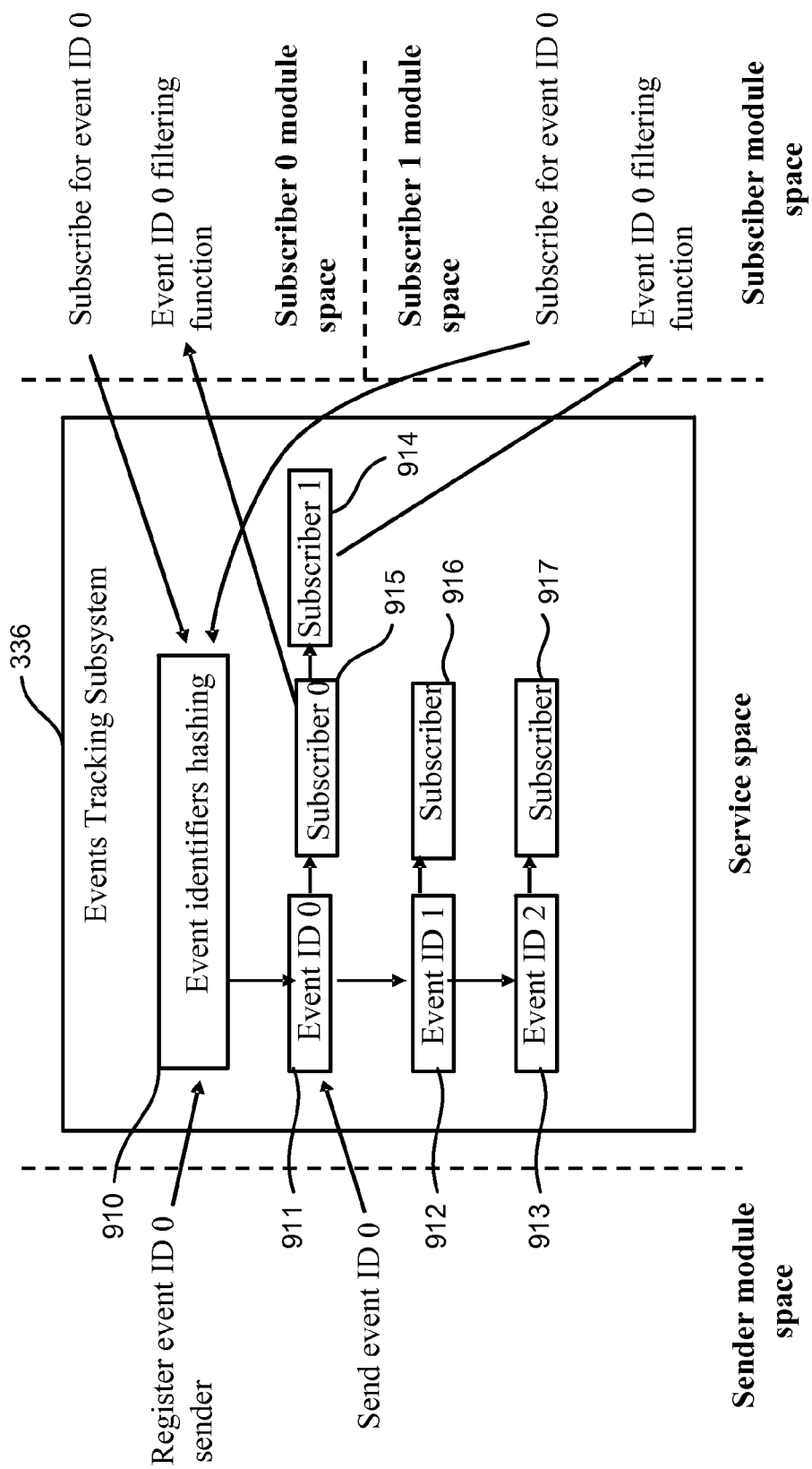
FIG. 9 illustrates functionality of event tracking subsystem of an Open Bus Hypervisor in accordance with an exemplary embodiment.

FIG. 9 illustrates functionality of event tracking subsystem 336 of the Open Bus Hypervisor. This subsystem allows management of low level events. The event tracking subsystem 336 is implemented in the Hypervisor Service space. The incoming events are registered by hashing of even identifiers. The low level events, such as, for example, interrupts or VMExits can arrive at very high volumes. Therefore, using hashing helps to identify the events more efficiently.

The primary communication between modules occurs through the ports, by sending messages. A message is a data structure stored in memory, which is transferred from a sender to a receiver through using a port identifier, which are structures referring to the sender and receiver. Each module registers the ports which that module will monitor. The Hypervisor Service Subsystem 130 has a locator 322, that stores which port is associated with which module and is located in which address space. In the same context, the message is sent to a particular port. The recipient receives the messages as follows:

1. The locator looks at where the port is.
   a. If in the same address space, then the port is called directly in a different module.
   b. If in a different space, then the call is through an HPC call. I.e., the point of the HPC call is to pack the formal call parameters into a buffer On the receiver side, the parameters are unpacked, but usually with different addresses and parameters, as if the function were called locally.

The events are received from a sender module space and have the subscriber module space that orders these events. The tracking subsystem located in the Service space tracks the events sent from the sender module space to the subscribers in the subscriber module spaces. Each of the events 911, 912 and 913 has corresponding subscribers 914, 915, 916 and 917, who can belong to a particular module space. The event IDs are registered in the event tracking subsystem 336 with the unique ID values, so the events of each subscriber can be tracked by their IDs. The event ID filtering functions can be used by the subscribers. The event tracking subsystem 336 also includes means 910 for hashing the event identifiers.

When a thread calls a function that is located outside the current context (or outside a context that is common for a set of currently executing threads), the thread calls a function to relay the parameters of the function in the hypervisor service subsystem 130, which is accompanied by switching the context to the Hypervisor. (In other for a thread to switch to a different context, it is necessary, when calling a function in a different context, to send the parameters of the function to the hypervisor service subsystem. In other words, simultaneous with calling the function, the parameters are passed. The Hypervisor also switches context.) Also, the function call has a corresponding port call, which is associated with the function and the context in which the function can be used. To simplify the search for a port, port hashing is used, as discussed earlier. The Hypervisor selects, based on the port's ID module, the context in which the function will be executed, and switches control to the specified context.

As one example, a port to which control is transferred can have a priority or a queue that defines when control can be transferred to that port. In another example, the ports can subscribe to events, i.e., to the function calls. At each function call, an event handler forms a notification regarding the event, and the event tracking subsystem 336 defines the ports, which subscribe to the events, and notifies the appropriate ports regarding the event. Then, based on the priority or by the queue turn, the context of the port is invoked and the parameters of the call are processed. If there are no ports subscribing to the event, the event is ignored. If there is a recipient, then a port is looked for (out of the set of ports for that recipient), which can receive the event/call. The events are then distributed to the ports, optionally based on priority and queue turn or position. A single event can be associated with multiple ports. An event exists as long as at least one port is still processing the event.

Each module, upon initialization, informs the system regarding any polling cycles that it might have. A polling cycle is an analog of a thread in the execution context. The polling cycle is responsible for taking the message from the port, waiting until the message/event appears in the queue. Note that the scheduler 324 uses not ports themselves, but the polling cycles, which are active at the moment. A lockless implementation of a hash table can be used, as well as other structures.

Figure 10:
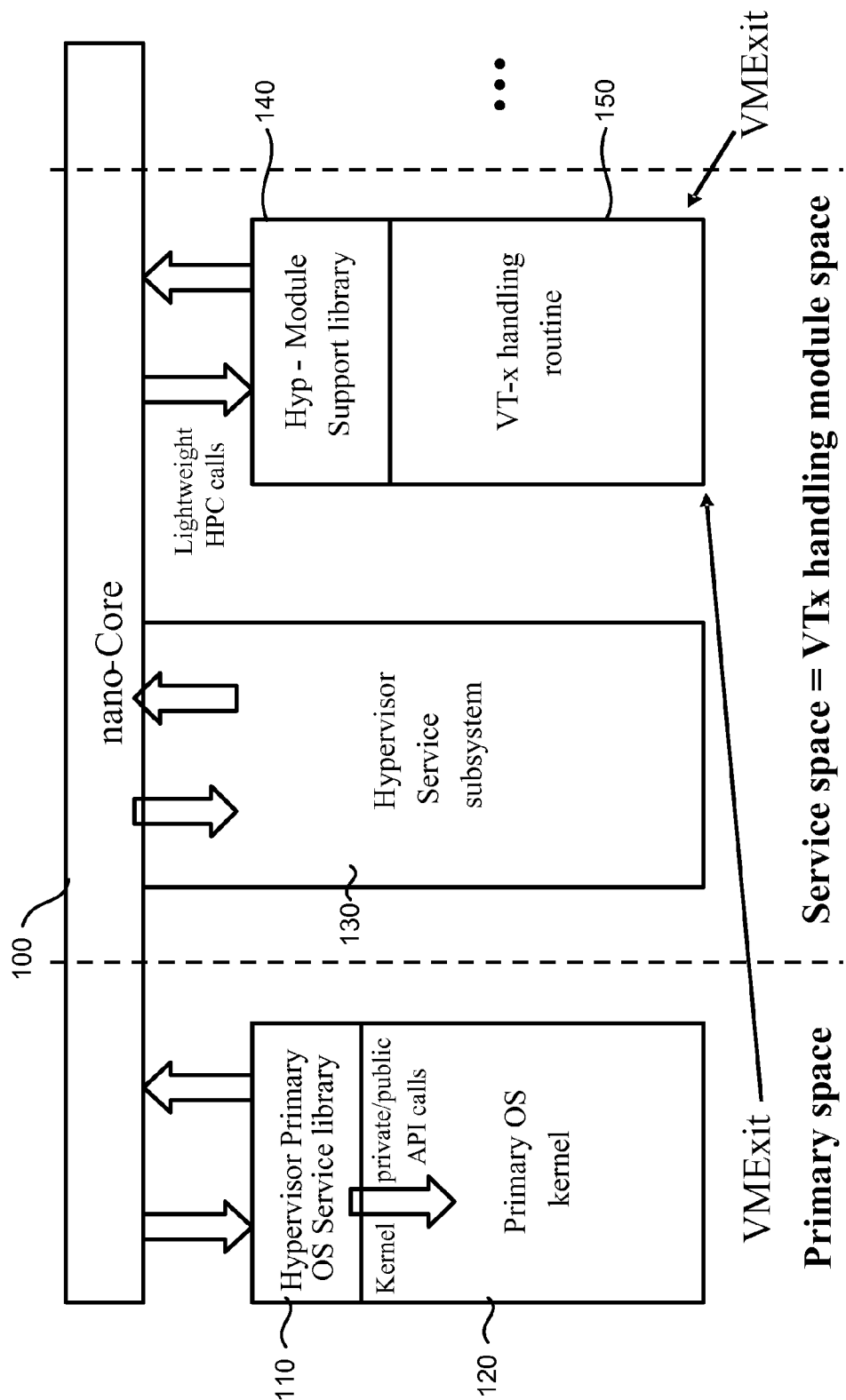
FIG. 10 illustrates handling of Intel's VT-X technology within an Open Bus Hypervisor in accordance with an exemplary embodiment.

FIG. 10 illustrates handling of VT-X within an Open Bus Hypervisor in accordance with an exemplary embodiment. VT-X handling is implemented as part of a common Open Bus Hypervisor architecture illustrated in FIG. 1. It includes a Hypervisor nano-core 100, a Hypervisor Service subsystem 130 and a POS service library 110. An Open Bus Hypervisor includes three spaces (third one is not shown in FIG. 10) connected over an open bus—the nano-core 100. A Primary space includes POS kernel 120 with POS service library 110. The Hypervisor Service subsystem 130 is located in Service space. A special Hyp-Module, where VT-X handling routine 150 is executed, is also located in Service space.

The Service space of the Hypervisor is dedicated to VT-X handling. The Hyp-Module receives light weight HPC calls. Events such as VMExits can be received by the Hyp-Module from Primary space as well as from VMMs (i.e., other Hyp-modules). Processing and redirection of interrupts is performed by the Support library 140. Since the Hyp-Module and the Hypervisor Service subsystem 130 are both located in Hypervisor Service Space, they can be switched to root level operation while POS works on lower privilege level.

Figure 11:
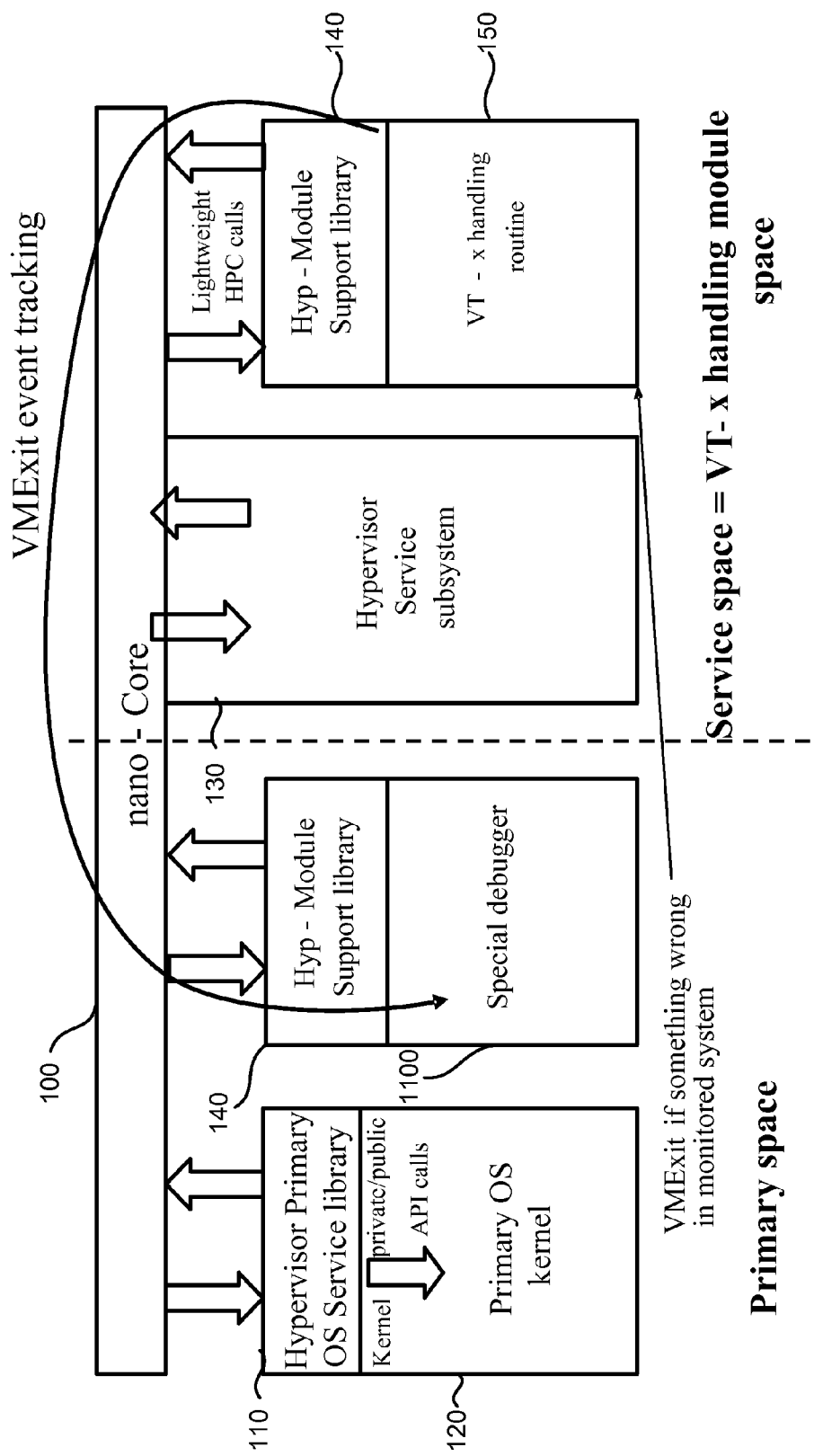
FIG. 11 illustrates implementation of an independent special debugger of an Open Bus Hypervisor in accordance with an exemplary embodiment.

FIG. 11 illustrates implementation of an independent special debugger 1100 of an Open Bus Hypervisor depicted in FIG. 1 in accordance with the preferred embodiment. The independent special debugger 1100 is implemented as part of a common Hypervisor architecture. The debugger 1100 is encapsulated into a Hyp-Module located in Primary space. The Hyp-Module has its own support library 140. The debugger 1100 is located in the Hypervisor Primary space, because it monitors processed in POS. If something goes wrong in POS, the VMExits are sent to VT-X handling routine and than the results of the processing are provided to the debugger via respective support libraries of both Hyp-Modules.

A significant advantage of the Open Bus Hypervisor, of the preferred embodiment, is that it frees a VM developer from having to develop his own set of drivers. By allowing the Primary OS to use its drivers to interact with the hardware, the developer of the Open Bus Hypervisor does not face the task of either writing his own set of drivers for each device that might conceivably be connected to the computer (a daunting task, since such devices today number in the thousands), or having to adapt someone else's driver model (such as LINUX) to working within the Hypervisor itself. This means that the development cost of such an Open Bus Hypervisor-based virtualization approach is dramatically less than it otherwise would be.

Again, it is worth recalling that many of the complaints about bugs and crashes (and general instability) of the Windows operating system derives not from mistakes by Microsoft programmers, but from mistakes of the third-party vendors who supply the driver software. As a practical matter, when the Hypervisor developers are confronted with the task of dealing with third party drivers, they may be just as likely to write a product that is similarly "buggy." Therefore, by using, as a Primary OS, an already existing operating system (such as Windows XP, Windows NT, LINUX, etc.), the development time for the overall virtualization system can be shortened considerably.

Furthermore, it should be noted that new types of hardware appear all the time, such as new video cards, new storage devices, new network cards, new wireless devices, etc. For most common operating systems, the vendors of these devices write the drivers practically as soon as the devices themselves appear on the market (and frequently are supplied with the device itself). Thus, the VM developer does not need to worry about supporting a never-ending stream of new hardware from third-party vendors, since the vendors themselves will provide the driver support for standard operating systems.

Another advantage is that there is no need to write a separate "Service OS" whose primary task is device/hardware interface and driver management. Writing even a limited-purpose operating system is a complex task. In the approach described herein, this task can be avoided, since the POS serves in place of any such driver-dedicated Service OS. The approach described herein permits using any standard operating system as the primary operating system, where the Primary OS also functions as a Service OS. The Primary OS can be easily integrated into the Open Bus Hypervisor.

It also worth noting that, up till now, Hypervisor-based systems have generally been found primarily, if not exclusively, in server-based environments, primarily due to the fact that installation and maintenance requires relatively skilled IT personnel, notwithstanding the fact that first Hypervisor-based systems were described two decades ago. The proposed Open Bus Hypervisor implementation is equally applicable to both server-based and desktop/laptop-based environments.

It should also be noted that running the Primary OS with less than the full privileges permits avoiding at least some of the sources of failures and instability. For instance, if the Primary OS itself decides to write something that it shouldn't to the hard disk drive (for example, the Primary OS itself replaces its own boot sector information with erroneous information), there is little that the Open Bus Hypervisor can do about that. On the other hand, some of the bugs are due to developers' mistakes, for example, where some instruction tries to access an area in memory that it shouldn't, or it tries to transfer control to some page that isn't available, triggering a page fault. With the Primary OS having less than full privileges, mistakes of the second type can be more easily handled, when the Open Bus Hypervisor detects them.

The Open Bus Hypervisor takes full advantage of hardware support for virtualization, if available on the processor. For example, current Intel processors have VT (VT-X, VT-I) technology that provides hardware based support for virtualization. Similarly, AMD Pacifica has new guest mode, and other processors have similar schemes. Where appropriate, the Open Bus Hypervisor will reserve these highest privileged modes for itself, and give lesser privileges for accessing devices to the Primary OS, and possibly even lesser privileges than that to the Guest OSs.

In another embodiment, a system without a VM present can be implemented. In this case, the Hypervisor provides a means for extensibility of POS's functions. According to this embodiment, an Open Bus Hypervisor is integrated with the POS and processes the OS features that are not supported by the POS. An Open Bus Hypervisor is extended by a "feature provider" module for handling additional POS functionality. This module initializes appropriate subsystems, hardware means, etc. It also generates specific low level events. Other Hyp-modules subscribe to these events and filter or process the events for their specific purposes.

Figure 12:
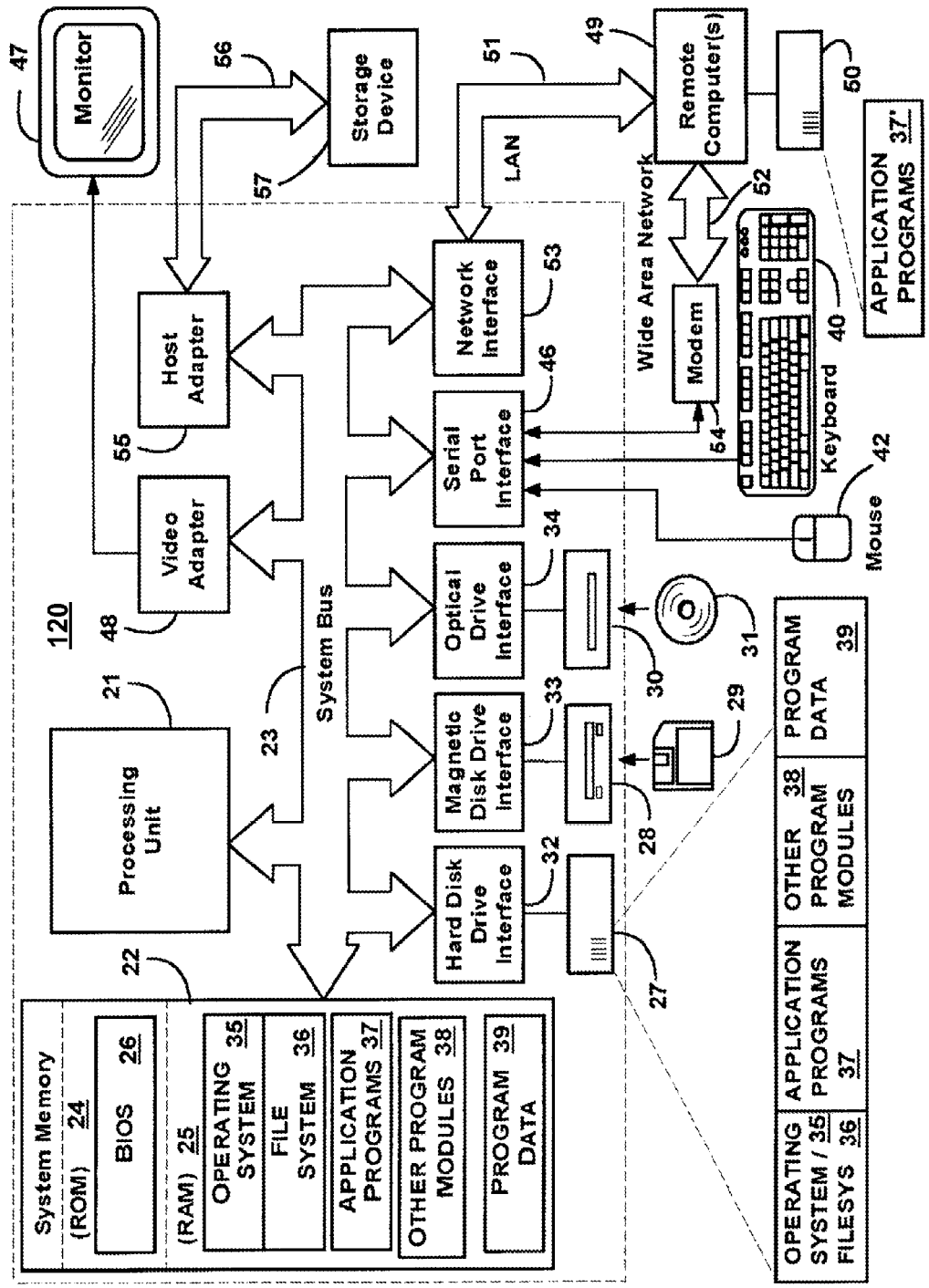
FIG. 12 illustrates an exemplary computer system on which an Open Bus Hypervisor can be implemented.

With reference to FIG. 12, an exemplary computer system, where the Open Bus Hypervisor can be implemented, includes a general purpose computing device in the form of a user-side computer and/or server-side computer 120 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read-only memory (ROM) 24 and random access memory (RAM) 25. A basic input/output system 26 (BIOS), containing the basic routines that help to transfer information between elements within the computer 120, such as during start-up, is stored in ROM 24. The computer 120 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 120. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., Windows™ 2000). The computer 120 includes a file system 36 associated with or included within the operating system 35, such as the Windows NT™ File System (NTFS), one or more application programs 37, other program modules 38 and program data 39. A user may enter commands and information into the computer 120 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers.

When used in a LAN networking environment, the computer 120 is connected to the local network 51 through a network interface or adapter 53. When used in a WAN networking environment, the computer 120 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 120, or portions thereof, may be stored in the remote memory storage device. It will be appreciated that the network connections shown are exemplary and other means of establishing a communications link between the computers may be used.

Having thus described a preferred embodiment of a system and method for implementation of an Open Bus Hypervisor, it should be apparent to those skilled in the art that certain advantages of the described method and apparatus have been achieved. In particular, it should be appreciated by those skilled in the art that system and method described in the preferred embodiment provides efficient support for hardware virtualization. It should also be appreciated that various modifications, adaptations, and alternative embodiments thereof may be made within the scope and spirit of the present invention. The invention is further defined by the following claims.

What is claimed is:

1. An Open Bus Hypervisor comprising:
   a nano-Core that switches context spaces between software modules;
   a primary operating system (POS) kernel encapsulated into a primary space;
   an isolated Hyp-Module space that is available for launching a software for supporting functionality of the Open Bus Hypervisor; and
   a Hypervisor service subsystem encapsulated into a service space,
   wherein the primary space, the service space and the Hyp-Module space are functionally connected via the nano-Core,
   wherein the nano-Core has its own space that is separate from the other the primary space, the service space and the Hyp-Module space, and has a higher privilege level than the POS,
   wherein the nano-Core is isolated from the POS, and
   wherein the nano-Core enables interaction between the primary space, the service space and the Hyp-Module space using a Hypervisor Primary OS service library and a Hyp-Module support library.

2. The Open Bus Hypervisor of claim 1, further comprising a plurality of Virtual Machine Monitors (VMMs) encapsulated in Hyp-Modules and connected to the nano-Core.

3. The Open Bus Hypervisor of claim 1, further comprising a Virtual Machine Monitor (VMM) encapsulated in the Hyp-Module space.

4. The Open Bus Hypervisor of claim 1, wherein the Hypervisor Primary OS Service library comprises:
   a Hypervisor Loader;
   a Hypervisor Procedure Call (HPC) support;
   an information support;
   an HPC over OS calls support; and
   an API wrapper.

5. The Open Bus Hypervisor of claim 1, wherein the Hypervisor service subsystem further comprises:
   an initialization;
   a locator;
   a scheduler;
   a space manager;
   a thread manager;
   a hypercall subsystem;
   a port manager;
   a transport support; and
   an event tracking subsystem.

6. The Open Bus Hypervisor of claim 5, wherein the locator includes a port locating subsystem.

7. The Open Bus Hypervisor of claim 5, wherein the locator includes a port locating subsystem.

8. The Open Bus Hypervisor of claim 1, wherein each space operates in its own context.

9. The Open Bus Hypervisor of claim 1, wherein the Hyp Module is located in the service space and includes a VT-X handling routine.

10. The Open Bus Hypervisor of claim 1, wherein at least one of the Hyp-Modules located in the service space uses hardware virtualization technology.

11. The Open Bus Hypervisor of claim 1, wherein at least one of the Hyp-Modules located in the primary space includes a special debugger.

12. A method of virtualizing a computer system comprising:
    providing a Primary Operating System (POS) on the computer system;
    implementing a plurality of Virtual Machines (VMs) on the POS, wherein the VMs run without system level privileges;
    activating a plurality of Virtual Machine Monitors (VMMs) for controlling the VMs;
    activating an Open Bus Hypervisor with highest privileges on the computer system;
    wherein the POS and the VMMs are integrated into the Open Bus Hypervisor and run with fewer privileges than the Open Bus Hypervisor,
    wherein the nano-Core has its own space that is separate from the other the primary space, the service space and the Hyp-Module space,
    wherein the nano-Core is isolated from the POS, and
    wherein the nano-Core has a higher privilege level than the POS; and
    providing exchange of low level events between the POS and the VMMs.

13. The method of claim 12, wherein the VMMs are encapsulated in Hyp-Modules connected to a nano-Core.

14. A non-transitory computer useable storage medium having computer program logic stored thereon for executing on a processor for implementing the steps of claim 12.

15. The method of claim 12, wherein the low level events are any of:
    exceptions;
    interrupts;
    virtualization-related instructions; and
    API calls.

* * * * *